(12) United States Patent
Assalve et al.

(10) Patent No.: US 9,394,821 B2
(45) Date of Patent: Jul. 19, 2016

(54) SYSTEM FOR IMPROVING THE PURIFYING LIQUID EVAPORATION IN AN AXIALLY SYMMETRIC DOSING MODULE FOR AN SCR DEVICE

(71) Applicant: FPT Motorenforschung AG, Arbon (CH)

(72) Inventors: Daniel Assalve, Appenzell Steinegg (CH); John Campbell, St. Gallen (CH); Harald Fessler, Arbon (CH); Reto Schlegel, Thal (CH)

(73) Assignee: FPT Motorenforschung AG, Arbon (CH)

( * ) Notice: Subject to any disclaimer, the term of this patent is extended or adjusted under 35 U.S.C. 154(b) by 0 days.

(21) Appl. No.: 14/570,628

(22) Filed: Dec. 15, 2014

(65) Prior Publication Data
US 2015/0167525 A1    Jun. 18, 2015

(30) Foreign Application Priority Data

Dec. 16, 2013  (EP) ..................................... 13197377

(51) Int. Cl.
| | |
|---|---|
| *F01N 3/00* | (2006.01) |
| *F01N 3/20* | (2006.01) |
| *F01N 3/28* | (2006.01) |
| *F01N 3/36* | (2006.01) |

(52) U.S. Cl.
CPC .............. *F01N 3/208* (2013.01); *F01N 3/2066* (2013.01); *F01N 3/28* (2013.01); *F01N 3/2892* (2013.01); *F01N 3/36* (2013.01); *F01N 2240/20* (2013.01); *F01N 2610/02* (2013.01); *F01N 2610/1453* (2013.01); *Y02T 10/24* (2013.01)

(58) Field of Classification Search
USPC ..................................................... 60/272–324
See application file for complete search history.

(56) References Cited

U.S. PATENT DOCUMENTS

| | | | | |
|---|---|---|---|---|
| 2010/0263359 | A1* | 10/2010 | Haverkamp | .......... F01N 3/2066 60/303 |
| 2011/0308234 | A1* | 12/2011 | De Rudder | .......... B01F 3/04049 60/295 |
| 2012/0263632 | A1* | 10/2012 | Campbell | ............. F01N 3/2066 423/212 |
| 2012/0317962 | A1* | 12/2012 | Campbell | ............. F01N 3/2066 60/295 |
| 2013/0152558 | A1* | 6/2013 | Loman | .................... B01F 5/045 60/317 |
| 2013/0167516 | A1* | 7/2013 | Loman | .................. F01N 3/2892 60/319 |

(Continued)

FOREIGN PATENT DOCUMENTS

| | | |
|---|---|---|
| EP | 2 339 137 A1 | 6/2011 |
| EP | 2 339 139 A1 | 6/2011 |

(Continued)

*Primary Examiner* — Jesse Bogue
(74) *Attorney, Agent, or Firm* — Blank Rome LLP

(57) ABSTRACT

Device for improving the purifying liquid evaporation in an axially symmetric dosing module for an SCR device. The dosing module is able to dose a urea-based reducing agent into a gas exhaust stream generated by a combustion engine. The dosing module comprises a housing developing symmetrically along a development axis; a nozzle for dosing the urea-based reducing agent, arranged along said development axis; and an inlet opening for conveying the gas exhaust stream into the dosing housing, arranged annularly with respect to the nozzle. The device further includes a splitting wall, arranged within the inlet opening for defining at least two separate annular gas stream paths, one annular and coaxial with respect to another, one of them shaped for inducing a different axial speed into a respective gas stream with respect to another.

12 Claims, 3 Drawing Sheets

(56) References Cited

U.S. PATENT DOCUMENTS

2013/0174537 A1* 7/2013 Loman .................... B01F 5/045
  60/310
2013/0305696 A1* 11/2013 Loman .................. F01N 3/2892
  60/295

FOREIGN PATENT DOCUMENTS

| WO | WO 2012/044233 A1 | 4/2012 |
| WO | WO 2012/047159 A1 | 4/2012 |
| WO | WO 2012/053960 A1 | 4/2012 |

* cited by examiner

SYSTEM FOR IMPROVING THE PURIFYING LIQUID EVAPORATION IN AN AXIALLY SYMMETRIC DOSING MODULE FOR AN SCR DEVICE

BACKGROUND OF THE INVENTION

1. Field of the Invention

The present invention relates to a device for improving the purifying liquid evaporation in an axially symmetric dosing module for an SCR device.

2. Description of the Related Art

Aftertreatment systems are, commonly, used to reduce emissions. The NOx reduction is mainly realized by a selective catalytic reduction (SCR) system. The required Ammonia (NH3) for the reduction of the NOx is usual injected as a liquid with dissolved UREA, commonly AdBlue or DEF (water with 32.5% UREA).

An example of axially symmetric evaporation device is given in EP2339137.

The evaporation of the liquid (water) and the decomposition (thermolysis and hydrolysis) of the UREA requires some energy. This energy is usually delivered by the exchange with hot exhaust gas. However, at lower exhaust gas temperature there is not only less available energy, although still sufficient, but the available temperature difference, between the exhaust gasses and the injected liquid, which enable the heat exchange is much reduced.

Another factor worsens the evaporation process, namely the fact that the heat transfer is less efficient at low mean gas velocities.

The overall result is a reduced of evaporation and associated effects of liquid wall films and risk of solid deposits. This is an unacceptable behavior due to wrong NH3 dosing to the SCR system and/or increased back pressure.

SUMMARY OF THE INVENTION

Therefore, it is the main object of the present invention to provide a device for improving the purifying liquid evaporation in an axially symmetric dosing system of an SCR device, which overcomes the above problems/drawbacks.

The main principle of the invention is to split the annular gas stream into two different gas streams directed towards the housing where the urea based agent is sprayed, so that one is annular and coaxial with respect the other, by defining an inner gas stream and an outer gas stream; moreover, the inner gas stream is accelerated with respect to the other in order to improve the mixing effect.

According to a preferred embodiment of the invention, the outer gas stream is swirl along the development axis, while the other flows according to the development axis.

Advantageously, the inner predominantly axial gas stream avoids deposits near the point of injection of the urea based solution spray.

Advantageously, the outer annular swirl is providing a radial outwards deflection of the spray by centrifugal force resulting in an increased area of distribution of the spray and this brings a reduction in the spray mass flux and a reduction in associated cooling effect on wall surfaces where the spray is incident.

The cooling effect of the spray to the pipe walls is also reduced because of the increased gas velocity and convection heat transfer created by the outer annular swirl on the outer wall of the pipe.

A further benefit is an enhanced evaporation of the liquid droplets passing through the shear region at the interface between the axial and swirled gas streams.

Preferably, the inner gas stream follows a path having a first portion tangent with respect to the dosage means and a second portion smoothly joining toward a direction parallel with respect to said development axis, while the outer gas stream is swirl over the development axis.

According with the present invention, said two gas streams are obtained by means of a splitting wall arranged within the annular inlet opening of the gas flow, by defining substantially a bell with either the main base and the minor base open.

The splitting wall comprises winding walls, for inducing a swirl on the outer gas stream.

Therefore, the inner gas stream is tangent with the Spray nozzle, while the outer stream is introduced into the housing far from the nozzle with a different axial speed so as to improve the mixing effect.

Being the present invention an improvement of the invention disclosed in EP2339137 of the same applicant, the content of said patent EP2339137 is herewith incorporated by reference.

Thanks to the present invention, only a portion of the gas stream is accelerated in order to achieve a better reducing agent evaporation at low mean gas velocities, while at high mean gas velocities the backpressure induced by the swirling means is limited, due to the fact that not the entire exhaust gas stream is swirled.

The attached claims form an integral part of the present description.

BRIEF DESCRIPTION OF THE DRAWINGS

The invention will become fully clear from the following detailed description, given by way of a mere exemplifying and non limiting example, to be read with reference to the attached drawing figures, wherein.

The same reference numerals and letters in the figures designate the same or functionally equivalent parts.

Figure 1:
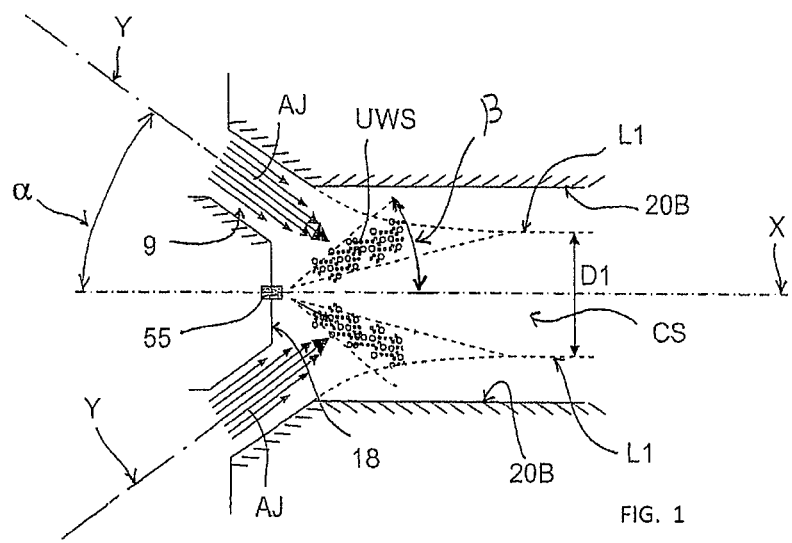
FIG. 1 shows a schematic longitudinal section of an axially symmetric dosing system for SCR devices, as disclosed in the prior art patent EP2339137.

In order to render the present description clear and easy to understand, the same reference signs of the recalled prior art FIG. 1 are used for the common parts/components between the prior art and the present invention, while the differencing components are referred to through new/different reference signs.

DETAILED DESCRIPTION OF THE PREFERRED EMBODIMENTS

The present invention refers to an improved dosing module DM according to the invention comprises a housing 20 which develops symmetrically along an axis X (also indicated with longitudinal axis X). In this regard, such dosing module is suitable to be integrated or added upstream of an SCR of an aftertreatment system of a combustion engine.

The dosing module comprises a housing 20 in which the urea-based reducing agent is injected as a spray.

The dosing module can be a part of the exhaust pipe upstream of the catalyst or part of the catalyst itself. The housing can have preferably a circular cross section. For the purpose of the invention, by the expression "cross section" or "transversal section" it is meant a section perpendicular to the development axis X.

The dosing module DM comprises an annular inlet opening 9, see FIG. 1, for conveying the exhaust gas stream, coming from the engine, into said housing 20.

The dosing module DM also comprises dosage means 55, disposed coaxially with respect to the dosing module DM, for dosing the urea-based reducing agent into the gas exhaust stream inside the housing 20, by producing a spray cone, in turn coaxial with the dosing module DM, whose opening is indicated by means of the angle β traced with respect to the development axis X.

Therefore, the nozzle 55 is placed on a point of the axis X of the housing 20. As alternative, several nozzles are arranged along a circumference annular and coaxial with the development axis X.

According to a preferred embodiment of the invention, the inlet opening 9 is annular and preferably inclined with respect to the longitudinal axis X of the housing so as to define the director axes Y, see FIG. 1.

The director axes Y form an angle α with respect to the development axis X.

According to a preferred embodiment of the present invention said angle α is less than 90°.

Therefore, the exhaust gas stream and the urea-based spray are incident within the development axis X.

According to the present invention, the exhaust gas stream 9 is split at least into two portions F1 and F2, through two separate inlets openings 13A and 12A and two separate outlets openings 13B and 12B, coaxial between each another, both annular with respect to the dosing means.

This is obtained through a splitting wall 1, arranged within the original inlet 9, by defining substantially a bell with a main base and a minor base, both open.

The paths and their respective gas streams are labelled with the same signs F1 and F2 for convenience.

Both the gas streams flow into the housing 20 where the reducing agent is sprayed.

Figure 2:
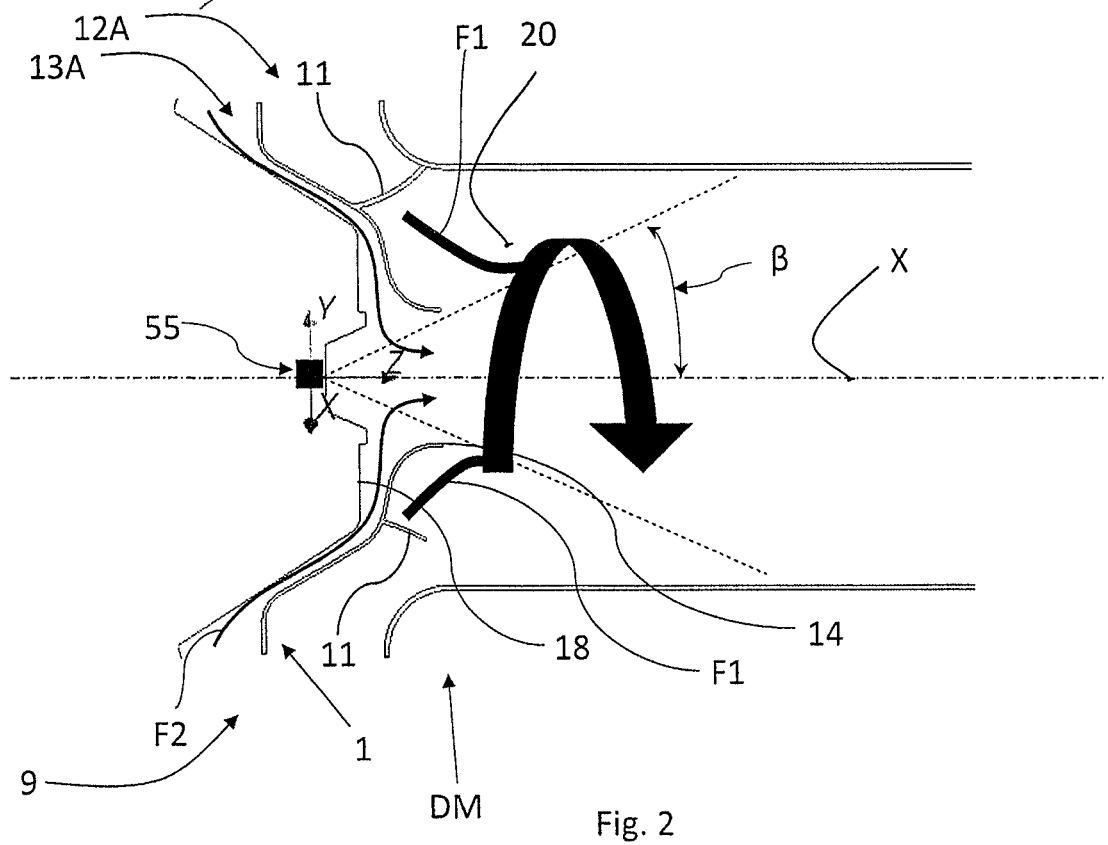
FIG. 2 shows schematically the present invention applied to the dosing system of FIG. 1.

The bell is tapered according to a urea-based reducing agent injection direction, namely from the left to the right, according to FIG. 2.

Also the splitting wall 1 has an axial symmetry with respect to the development axis X.

The inner gas stream F2 is conveyed towards the housing 20 being tangent, in a first portion of its path, to the spray means 55. The path followed by the inner gas stream F2 is shaped to accelerate the gas stream itself according to an axial direction, in order to improve the mixing effect. Preferably, a second portion of the path F2 is smoothly joined with the axial direction X defined by the device itself.

The outer gas stream F1 is conveyed towards the same housing 20 in a zone far from the spay means 55, with a slower speed with respect to the gas stream F2.

Preferably, within the housing 20 there are not walls or further elements, so that the gas stream are in reciprocal contact after being released by the splitting walls.

Therefore, the two gas stream paths are shaped in order to obtain a different axial speed.

In this regard, the inlet section 13A of the F2 path can be larger then the outlet section 13B and vice versa for the F1 path. In other words the paths sections can be varied in order to difference the axial speeds of the gas streams.

According to a preferred embodiment of the device, the axial outlet section 13B is obtained through a mouth 14 defining a cylindrical surface, that accompanies the inner axial gas stream F2.

According to a preferred embodiment of the invention, the outer gas stream is swirl about the development axis X in order to further lower its axial speed.

Therefore, within the housing 20, the inner gas stream is substantially axial, the outer one is spirally wound over the inner one being in reciprocal contact, namely without any separating element interposed between them.

Figure 3:
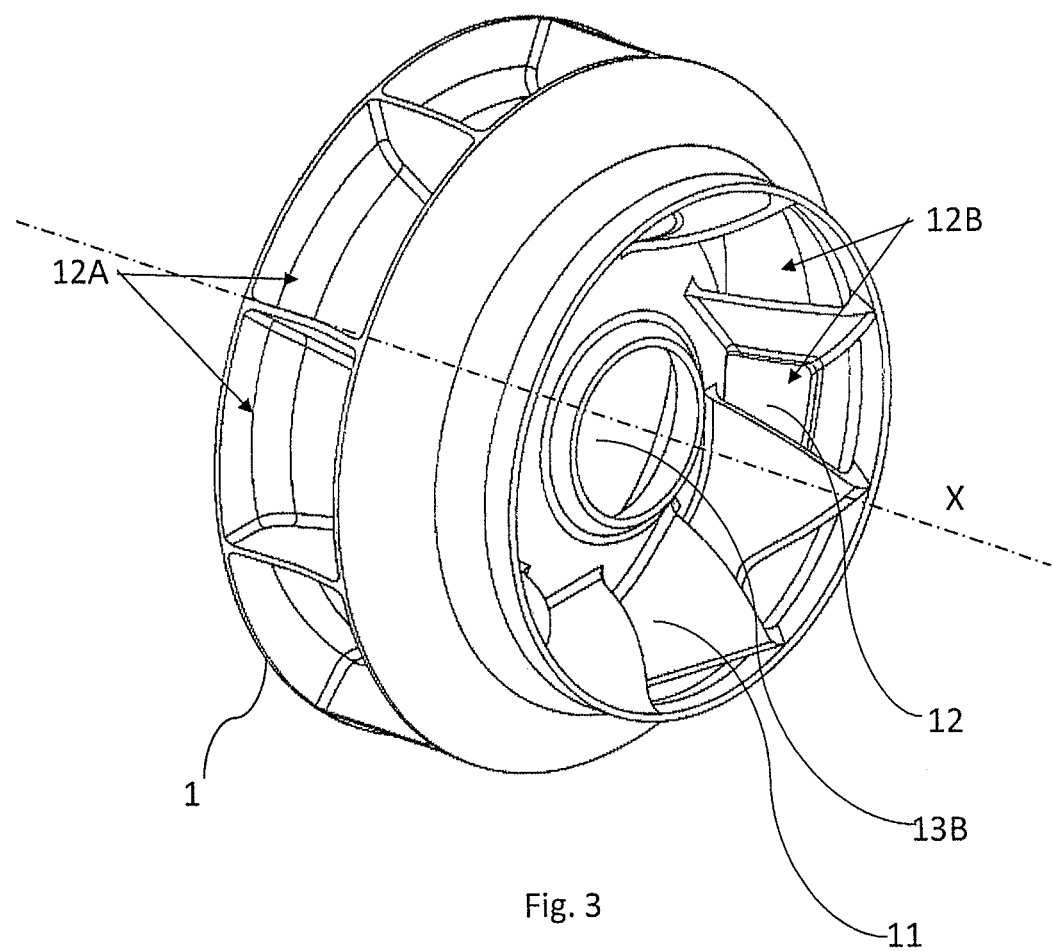
FIG. 3 shows a perspective view of a portion of the dosing system disclosed on FIG. 2.
Figure 4:
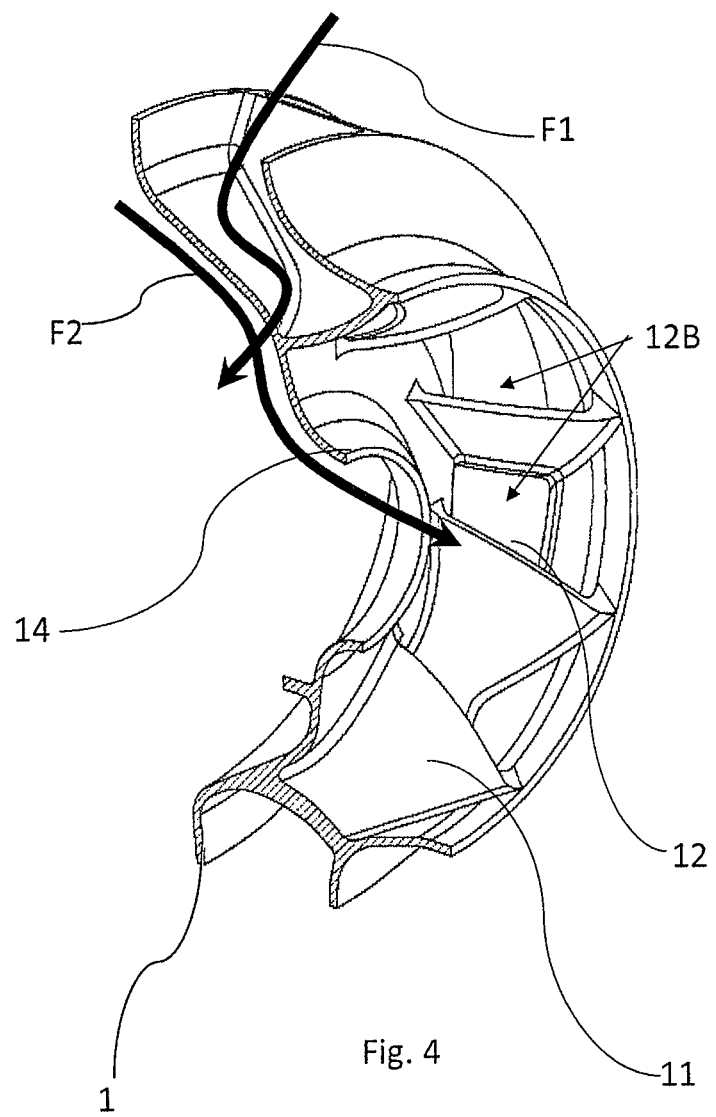
FIG. 4 shows a sectional view of the portion of FIG. 3.

Therefore, the splitting wall 1 comprises winding walls 11, as shown on FIGS. 2 and 3, for inducing a swirl on the outer gas stream F1 of the exhaust gas flow.

It should be understood that the paths could be shaped in order to vary the axial speeds of the gas streams without any swirl or could be shaped to induce a swirl on the inner gas stream or different coaxial layers with equal or different swirl.

Although, the exhaust gas stream is shown as split into only two streams, it should be understood that the exhaust gas stream could be split into more than two annular streams, either inducing or not a swirl.

Many changes, modifications, variations and other uses and applications of the subject invention will become apparent to those skilled in the art after considering the specification and the accompanying drawings which disclose preferred embodiments thereof. All such changes, modifications, variations and other uses and applications which do not depart from the spirit and scope of the invention are deemed to be covered by this invention.

Further implementation details will not be described, as the man skilled in the art is able to carry out the invention starting from the teaching of the above description.

What is claimed is:

1. Device for improving the purifying liquid evaporation in an axially symmetric dosing module for an SCR device, the dosing module being able to dose a urea-based reducing agent into a gas exhaust stream generated by a combustion engine, said dosing module comprising:
    a housing developing symmetrically along a development axis;
    a nozzle for dosing said urea-based reducing agent into said housing, arranged along said development axis;
    an inlet opening for conveying said gas exhaust stream into said dosing housing, arranged annularly with respect to said nozzle;
    the device comprising a splitting wall, defining a bell with a main base and a minor base, both open, arranged within the inlet opening for defining at least two separate gas stream paths, one annular and coaxial with respect to another, both annular with respect to said nozzle, both flowing out into said housing, one of said paths being shaped for inducing a different axial speed into a respective gas stream with respect to another;
    wherein one of said gas stream paths defines an inner path having a first portion having a radial component to convey towards said development axis of the device and a second portion joining towards a direction parallel with respect to said development axis, and
    wherein said inner path induces a highest axial speed with respect to the other paths.

2. Device according to claim 1, wherein said minor base comprises a frusto-conical edge, internally shaped in order to direct said second portion joining towards said direction parallel with respect to said development axis.

3. Device according to claim 2, wherein said gas stream paths both flow out into said housing, without any separating element interposed between them.

4. Device according to claim 1, wherein the outer gas stream path is swirled over the development axis in order to develop a reduced axial speed by increasing a differential speed between the gas streams.

5. Device according to claim 1, wherein said bell is tapered according to a urea-based reducing agent injection direction.

6. Device according to claim 1, wherein at least one face of said splitting wall is provided with winding walls, for inducing a swirl on said another gas stream path.

7. Device according to claim 1, wherein at least one face of said splitting wall defines inlets and outlets for said stream paths and the corresponding paths sections can have different sizes in order to differentiate the axial speeds of the gas streams.

8. Device according to claim 1, wherein said nozzle lays on said development axis or several nozzles arranged along a circumference coaxial with the development axis.

9. Device according to claim 1, wherein said nozzle is designed so as to generate an urea-based reducing agent spray having a half-cone opening angle ($\beta$) comprised between 5 and 40 degrees with respect to the development axis.

10. Exhaust gas system of an combustion engine of a vehicle comprising an axially symmetric dosing module for an SCR device and a device for improving the purifying liquid evaporation according to claim 1.

11. Vehicle comprising an exhaust gas system according to claim 10.

12. Device according to claim 1, wherein said nozzle is inserted in the center of another bell-shaped structure, on which said splitting wall is enslaved.

* * * * *